United States Patent
Jebson et al.

(10) Patent No.: US 9,378,162 B2
(45) Date of Patent: Jun. 28, 2016

(54) HANDLING AND ROUTING INTERRUPTS TO VIRTUAL PROCESSORS

(71) Applicant: ARM LIMITED, Cambridge (GB)

(72) Inventors: Anthony Jebson, Cambridge (GB); Andrew John Turner, Cambridge (GB); Matthew Lucien Evans, Cambridge (GB); Gareth James Evans, Cambridge (GB); Adam James McNeeney, Cambridge (GB)

(73) Assignee: ARM Limited, Cambridge (GB)

( * ) Notice: Subject to any disclaimer, the term of this patent is extended or adjusted under 35 U.S.C. 154(b) by 394 days.

(21) Appl. No.: 13/898,816

(22) Filed: May 21, 2013

(65) Prior Publication Data

US 2014/0351471 A1 Nov. 27, 2014

(51) Int. Cl.
G06F 13/24 (2006.01)
G06F 9/48 (2006.01)
G06F 9/455 (2006.01)

(52) U.S. Cl.
CPC ............ G06F 13/24 (2013.01); G06F 9/45533 (2013.01); G06F 9/4812 (2013.01)

(58) Field of Classification Search
CPC .............................. G06F 13/14; G06F 9/45558
See application file for complete search history.

(56) References Cited

U.S. PATENT DOCUMENTS

| 5,361,375 | A | 11/1994 | Ogi |
| 6,961,806 | B1 | 11/2005 | Agesen et al. |
| 7,209,994 | B1 | 4/2007 | Klaiber et al. |
| 2004/0205272 | A1 | 10/2004 | Armstrong et al. |
| 2004/0215860 | A1 | 10/2004 | Armstrong et al. |
| 2006/0123416 | A1* | 6/2006 | Cibrario Bertolotti ............ G06F 9/45533 718/1 |
| 2007/0157197 | A1 | 7/2007 | Neiger et al. |
| 2009/0204959 | A1 | 8/2009 | Anand et al. |
| 2009/0300250 | A1 | 12/2009 | Weissman |
| 2010/0023666 | A1 | 1/2010 | Mansell et al. |
| 2010/0191885 | A1* | 7/2010 | Serebrin ............... G06F 9/4812 710/260 |
| 2011/0106993 | A1 | 5/2011 | Arinobu et al. |

(Continued)

OTHER PUBLICATIONS

International Search Report and Written Opinion of the International Searching Authority dated Jul. 31, 2014 in PCT/GB2014/051279, 13 pages.

(Continued)

*Primary Examiner* — Tim T Vo
*Assistant Examiner* — Phong H Dang
(74) *Attorney, Agent, or Firm* — Nixon & Vanderhye P.C.

(57) ABSTRACT

An interrupt controller for controlling the routing and handling of interrupts received at a data processing apparatus including at least one physical processing unit configured to run at least one of a plurality of virtual processors and a memory. The interrupt controller includes redistribution circuitry with at least one data store corresponding to the unit, the data store storing a pointer to a virtual pending table storing currently pending virtual interrupts for a virtual processor currently running on the corresponding unit and a pointer to a pending table configured to store currently pending physical interrupts for the corresponding unit and an input configured to receive a virtual interrupt for interrupting a virtual processor. Control circuitry is configured to add the virtual interrupt to the virtual pending table and to store the virtual interrupt in the virtual pending table for the virtual processor that is stored in the memory.

22 Claims, 7 Drawing Sheets

(56) References Cited

U.S. PATENT DOCUMENTS

| | | |
|---|---|---|
| 2011/0161541 A1 | 6/2011 | Madukkarumukumana et al. |
| 2011/0197003 A1 | 8/2011 | Serebrin et al. |
| 2013/0054860 A1* | 2/2013 | Tsirkin .................. G06F 13/24 710/266 |
| 2013/0326102 A1 | 12/2013 | Marietta et al. |
| 2014/0331001 A1* | 11/2014 | Liu ....................... G06F 3/0659 711/103 |

OTHER PUBLICATIONS

Z. Cui et al, "Optimizing Overlay-based Virtual Networking Through Optimistic Interrupts and Cut-through Forwarding" IEEE, Nov. 2012, 11 pages.

G. Strongin, "Trusted computing using AMD 'Pacifica' and 'Presidio' secure virtual machine technology" *Information Security Technical Report*, 2005, pp. 120-132.

* cited by examiner

HANDLING AND ROUTING INTERRUPTS TO VIRTUAL PROCESSORS

TECHNICAL FIELD

The technical field relates to data processing and in particular to data processors that can execute a plurality of virtual processors and interrupt control circuitry for routing interrupts to the virtual processors.

BACKGROUND

In the field of data processing apparatus that can execute various virtual processors the control and routing of interrupts to the virtual processors can be complicated and can require a large number of cycles to resolve. Conventionally in a system with multiple processors executing at one time, some of which are virtual processors, a hypervisor controls the interrupts and determines where to send them.

Conventionally this has been done using an interrupt translation table, which defines the ID of the interrupt seen by the software and the processor to which the interrupt should be sent. Where there is an interrupt to a virtual processor, the table maps the received virtual interrupt to a physical interrupt. The hypervisor then needs to do the reverse mapping and may then have to schedule the virtual machine if it is not currently active. This reverse mapping has generally required a large number of cycles. Furthermore, where there are many virtual processors, the interrupt translation table that stores these mappings can be very large.

It would be desirable to be able to handle virtual interrupts with a lower software performance overhead and without the need to store large amounts of data.

SUMMARY

A first aspect provides an interrupt controller for controlling the routing and handling of interrupts received at a data processing apparatus, said data processing apparatus comprising at least one physical processing unit, said at least one physical processing unit being configured to run at least one of a plurality of virtual processors and a memory configured to store at least one virtual pending table for storing pending virtual interrupts for a corresponding one of said plurality of virtual processors, said interrupt controller comprising:

redistribution circuitry comprising at least one data store corresponding to said at least one physical processing unit, said at least one data store being configured to store a pointer to a virtual pending table configured to store currently pending virtual interrupts for a virtual processor currently running on said corresponding physical processing unit and a pointer to a pending table configured to store currently pending physical interrupts for said corresponding physical processing unit;

an input configured to receive a virtual interrupt for interrupting a virtual processor;

control circuitry configured to:

to respond to receipt of said virtual interrupt to access said at least one data store in said redistribution circuitry corresponding to said at least one physical processing unit with which said virtual processor is currently associated, and to determine from said data store whether said virtual processor of said virtual interrupt is currently running on said physical processing unit; and if it is, to add said virtual interrupt to said virtual pending table pointed to by said redistribution circuitry; and if it is not, to store said virtual interrupt in said virtual pending table for said virtual processor that is stored in said memory.

The technology described herein recognises that the sending of a virtual interrupt to a virtual processor which may not be currently active is not straightforward and conventional solutions to this have required significant software intervention. The present invention recognises that where there is circuitry associated with a processing unit which indicates which virtual processor(s) is currently running on the processing unit, access to this circuitry can provide information regarding the current status of the virtual processor. Furthermore, where there are virtual pending tables for storing pending virtual interrupts in memory even for virtual processors not currently running, a virtual interrupt received can be routed to the appropriate table if the virtual processor is not currently active and the interrupt can be processed later when the virtual processor is activated. Where the virtual processor is active it can be routed to this virtual processor also via the virtual pending table that is currently being used. In this way a simple solution that does not require significant software intervention is provided that deals with virtual interrupts and allows them to be stored in an appropriate pending table regardless of whether the virtual processor to be interrupted is currently active.

In some embodiments, said control circuitry is configured in response to determining from said data store that said virtual processor is not currently running on said physical processing unit to generate a physical interrupt and store said physical interrupt in said pending table pointed to by said accessed data store in said redistribution circuitry, said physical interrupt indicating that there is a pending interrupt for a virtual processor not currently running.

Although it may be sufficient to simply store a pending virtual interrupt of a virtual processor that is not currently active in a table in memory, it may be advantageous to signal to the processor that an interrupt has arrived for that virtual processor such that the processor can decide to activate that virtual processor where it deems it to be appropriate. Thus, in some embodiments control circuitry in the interrupt controller will generate a physical interrupt and store it in the pending table pointed to by the access data store in the redistribution circuitry. This interrupt indicates that there is a pending interrupt for a virtual processor not currently running and the processor can determine from this whether or not to initiate running of the virtual processor.

In some embodiments, said control circuitry is configured to set a priority of said physical interrupt stored in said pending table, said priority being set in dependence upon at least one of a priority of said virtual interrupt and a priority for pending virtual interrupts set for said virtual processor by software during configuration.

It may be advantageous to set a priority of the physical interrupt stored in the pending table such that the processor can determine whether to take the interrupt or not. The priority of the physical interrupt could depend on the priority of the virtual interrupt such that important virtual interrupts can be taken quickly. Alternatively and/or additionally, it may depend on the configuration of the device, the device being set up to prioritise or otherwise virtual interrupts received for particular virtual processors. In any case, the physical interrupt acts as an indicator to the processor that there is an interrupt for the virtual processor waiting and it also provides some indication of how important it is to take this interrupt quickly or otherwise.

In some embodiments, said data processing apparatus comprises a plurality of processing units, and said redistribution circuitry comprises a plurality of said data stores, each of said plurality of data stores corresponding to one of said plurality of said processing units.

Although, there may be a single data processing unit which runs a plurality of virtual processors, in many embodiments there will be a plurality of processing units and there will be redistribution circuitry having data stores corresponding to each of the processing units. Thus, the interrupt controller will access the redistribution circuitry associated with the corresponding processing unit that the virtual processor is associated with.

In some embodiments, said control circuitry is configured to respond to receipt of said virtual interrupt to access a set of hierarchical tables stored in said memory to determine said physical processing unit with which said virtual processor is currently associated.

The control circuitry needs to determine which of the different physical processing units the virtual processor is associated with in order to access the appropriate data store in the redistribution circuitry. This may be done using a set of hierarchical tables that are stored in the memory and which store information regarding which processing unit a particular virtual processor is currently associated with.

In some embodiments, said data processing apparatus comprises a further table associated with said set of hierarchical tables for storing information regarding said virtual interrupts said information including a priority of said virtual interrupt.

It may be advantageous to store data related to the virtual interrupts in a separate table to the hierarchical tables. The hierarchical tables are required for the routing of the interrupt and the separate table stores other information, generally configuration information such as priority of the interrupt. The advantage of this is that the separate table can be located within virtual memory, that is memory allocated by the OS running on the virtual processor from the pool allocated to it by the hypervisor. This allows the table to be accessed directly by the virtual processor allowing it to be updated without the intervention of the hypervisor.

In some embodiments, said set of hierarchical tables comprises a device table, an interrupt translation table and a virtual processing unit table, said control circuitry being configured to access a location in said device table identified by said virtual interrupt, said accessed location indicating a portion of an interrupt translation table to access, and to access a location identified by said virtual interrupt in said portion of said interrupt translation table identified by said device table, said data stored in said accessed location in said interrupt translation table providing an indication of a location in said virtual processing unit table, which location stores data indicating which of said plurality of processing units said virtual processor to be interrupted by said virtual interrupt is currently associated with.

The set of hierarchical tables may comprise three tables including a device table which includes information regarding the different virtual devices of the system from which interrupts can be received. The device table is used to index into a translation table which stores information regarding the type of interrupt and provides a pointer into a virtual processing unit table which provides information as to which physical processing unit the virtual processor is currently associated with. In this regard, the interrupt received will have a device ID indicating the device from which it was received and data which is an indication of how to index into the interrupt translation table. The device ID allows one to index into the device table from which one determines the size and the base address of the portion of the interrupt translation table that corresponds to this device. This base address along with the data of the interrupt is used to index into the interrupt translation table and determine the type of interrupt be it virtual or physical and also to find a pointer for pointing to a virtual processing unit table from which one can discover the address of the redistribution circuitry to be accessed that corresponds to the appropriate physical processing unit and also the address of the virtual pending table in memory. In this way, in these hierarchical tables information is stored that allows one to send the interrupt to each virtual processor without the intervention of software.

In some embodiments, said redistribution circuitry comprises a plurality of caches associated with said plurality of data stores, said plurality of caches being configured to store said virtual pending table of said virtual processor currently running on said corresponding physical processing unit.

When a virtual processor is active then the redistribution circuitry may read data from the virtual pending table corresponding to the active virtual processor and store the data into caches associated with it in the interrupt controller. In this way, the information for the virtual pending tables is easily accessible and the virtual interrupts stored therein can be activated according to their priority.

In some embodiments, said redistribution circuitry comprises a plurality of units each comprising one of said at least one data store and each associated with one of said plurality of processing units, each of said units of said redistribution circuitry being configured to have sole write access to a portion of said memory storing said virtual pending tables for virtual processors currently associated with said corresponding physical processing unit.

The redistribution circuitry may be arranged in units, each one corresponding to a particular physical processing unit. Each of the units of the redistribution circuitry may be configured to have sole write access to the portion of the memory that stores the virtual pending tables for virtual processors currently associated with the corresponding physical processing unit. In this way, the redistribution circuitry has ownership of these virtual pending tables and can update them safe in the knowledge that nobody else will be trying to update them at the same time. This removes any atomic requirement on the updating and allows control of the virtual interrupts to be routed via this redistribution circuitry which allows the redistribution circuitry to update the tables as required and also to move them if this is also a requirement. In this way the virtual interrupts can be controlled in a safe and simple manner.

In some embodiments, said interrupt controller is configured to respond to receipt of a move command to move a virtual interrupt targeted at one virtual processor to target a different virtual processor by:

determining a base address of said virtual pending table and which physical processing unit said virtual processor is currently associated with for both said one virtual processor and said different virtual processor;

accessing said unit of said redistribution circuitry corresponding to said physical processing unit with which said one virtual processor is currently associated and transmitting to said redistribution circuitry said base addresses of said virtual pending tables and data regarding said physical processing unit that said different virtual processor is associated with:

accessing said unit of said redistribution circuitry corresponding to said physical processing unit with which said different virtual processor is currently associated;

said redistribution circuitry being configured on receipt of said data to clear a pending status of said virtual interrupt in said virtual pending table for said one virtual processor; and to update said virtual pending table of said different virtual processor with said pending virtual interrupt.

One example where this sole write access is convenient is where a virtual interrupt targeted at one virtual processor is required to be moved to a different virtual processor. This can be done in a simple way by the updating of the virtual pending tables and as the redistribution circuitry is the only circuitry with write access to this portion of memory one can route the commands via the redistribution circuitry and can in a simple and effective manner move virtual pending interrupts.

In some embodiments, said interrupt controller is configured to clear a pending status of said virtual interrupt by deleting said interrupt from said virtual pending table.

A pending status of a virtual interrupt can be cleared simply by deleting it from the pending table. It could then be set in a different table.

In some embodiments, said redistribution unit corresponding to said physical processing unit with which said different virtual processor is currently associated, is configured to determine whether said virtual processor of said virtual interrupt is currently running on said physical processing unit and if it is not, to store a physical interrupt in said pending table pointed to by said accessed data store in said redistribution circuitry, said physical interrupt indicating that there is a pending virtual interrupt for a virtual processor not currently running.

When moving the virtual interrupts, it may be convenient to set a physical interrupt for the physical processing unit with which the virtual processor that has now received the interrupt is associated. In this way, the physical processing unit can select and initiate this virtual processor as required.

In some embodiments, said interrupt controller is configured to respond to said move command by issuing a barrier command to follow said move command such that read accesses to said redistribution circuitry cannot complete until said accesses to said redistribution circuitry triggered by said move command have completed.

When moving the virtual interrupts between virtual processors, it may be convenient to set a barrier command to ensure that the interrupt sequences complete before further commands are issued. For example, it may be desirable to ensure that the interrupt is no longer pending on the old processor. Thus, the barrier command can result in a blocking read over the same standard fabric as is used by the move command to the redistribution circuitry. It should be noted that the physical interrupt that might have been associated with the move of virtual interrupt may be regenerated for the new virtual processor but the originally generated one is not moved. This is not a problem as it just results in an unnecessary hypervisor entry which is perhaps not very performance efficient but does not cause any errors. The bather command can be a separate command or it may be that the move command is a combined move and barrier command MOV sync, for example. Having them as separate commands enables a plurality of move commands to be performed sequentially with a single barrier command sent to follow them, for example MOV, MOV, MOV, sync.

In some embodiments, said interrupt controller is configured to respond to receipt of a move between physical processing units command which signals moving of a virtual processor associated with one of said plurality of physical processing units to a different one of said plurality of physical processing units, to:

access said data store in said redistribution circuitry corresponding to said physical processing unit with which said virtual processor was originally associated and to determine from said pointer if said virtual processor is currently running and if so, said redistribution circuitry is configured to write data from said virtual pending table pointed to by said pointer to a corresponding virtual pending table stored in memory; and to update said hierarchical tables such that said virtual processor is associated with said different one of said plurality of physical processing units.

A further implementation that can be done is moving virtual processors between physical processing units. The way that information regarding interrupts for the virtual processors is stored in virtual pending tables means that the transfer of virtual interrupts when this movement of virtual processors occurs is relatively straight forward and can be done as a simple set of steps accessing the redistribution circuitry and updating the various data stores and hierarchical tables as required.

In some embodiments, said interrupt controller is configured to stall sending any newly received interrupts to said virtual processor being moved until said update of said hierarchical tables is complete.

Where the virtual processors are moved between physical processing units then the interrupt controller may wish to stall sending any newly received interrupts for the virtual processor being moved until the update of the hierarchical tables is complete. If it does not do this, then the newly received interrupts may be misrouted.

In some embodiments, said interrupt controller is configured to issue a barrier command to follow said move between physical processing units command, said interrupt controller awaiting a response to said barrier command before issuing further interrupts, said response indicating that said update of said hierarchical tables has completed.

In order to ensure that the updates of tables is complete before sending further interrupts a barrier command may be used, a response to the bather command indicating that the update of the hierarchical tables is complete.

A second aspect of the present invention provides a data processing apparatus comprising:

at least one physical processing unit, said at least one physical processing unit being configured to run at least one of a plurality of virtual processors;

a memory configured to store at least one virtual pending table for storing pending virtual interrupts for a corresponding one of said plurality of virtual processors; and an interrupt controller for controlling and handling interrupts according to a first aspect of the present invention.

In some embodiments, said memory is configured to store a set of hierarchical tables for controlling said interrupts, said hierarchical tables comprising device, interrupt translation and virtual processing unit tables, said tables being accessible in response to one of said interrupts, said interrupt indicating a location to access in said device and interrupt translation tables;

said device table storing a pointer to said interrupt translation table;

said interrupt translation table storing an interrupt identifier and a pointer to said virtual processing unit table; and said virtual processing unit table storing data indicating which of said plurality of processing units said virtual processor to be interrupted by said virtual interrupt is currently associated with.

A third aspect of the present invention provides a method of controlling the routing and handling of interrupts received at a data processing apparatus, said data processing apparatus comprising at least one physical processing unit, said at least one physical processing unit being configured to run at least one of a plurality of virtual processors and a memory configured to store at least one virtual pending table for storing pending virtual interrupts for a corresponding one of said plurality of virtual processors, said method comprising the steps of:

receiving a virtual interrupt for interrupting a virtual processor;

determining which of said at least one physical processing units said virtual processor is currently associated with;

accessing a data store in redistribution circuitry corresponding to said at least one physical processing unit with which said virtual processor is currently associated;

determining from said data store whether said virtual processor of said virtual interrupt is currently running on said at least one physical processing unit;

if it is, adding said virtual interrupt to said virtual pending table pointed to by said redistribution circuitry; and if it is not, storing said virtual interrupt in said virtual pending table for said virtual processor that is stored in said memory.

A fourth aspect of the present in invention provides a computer program for controlling a data processing apparatus to perform a method according to a third aspect of the present invention.

A fifth aspect of the present invention provides interrupt controlling means for controlling the routing and handling of interrupts received at a data processing apparatus, said data processing apparatus comprising at least one physical processing means for running at least one of a plurality of virtual processing means and a memory means for storing at least one virtual pending table for storing pending virtual interrupts for a corresponding one of said plurality of virtual processing means, said interrupt controlling means comprising:

redistribution means comprising at least one data storing means corresponding to said at least one physical processing means, said at least one data storing means for storing a pointer to a virtual pending table configured to store currently pending virtual interrupts for a virtual processing means currently running on said corresponding physical processing means and a pointer to a pending table configured to store currently pending physical interrupts for said corresponding physical processing means;

an input means for receiving a virtual interrupt for interrupting a virtual processor;

control means for:
  responding to receipt of said virtual interrupt to access said at least one data store in said redistribution circuitry corresponding to said at least one physical processing unit with which said virtual processor is currently associated, and
  determining from said data store whether said virtual processor of said virtual interrupt is currently running on said physical processing unit; and
  if it is, adding said virtual interrupt to said virtual pending table pointed to by said redistribution circuitry; and if it is not, storing said virtual interrupt in said virtual pending table for said virtual processor that is stored in said memory.

The above, and other objects, features and advantages of this invention will be apparent from the following detailed description of illustrative embodiments which is to be read in connection with the accompanying drawings.

DESCRIPTION OF THE EXAMPLE NON-LIMITING EMBODIMENTS

Figure 1:
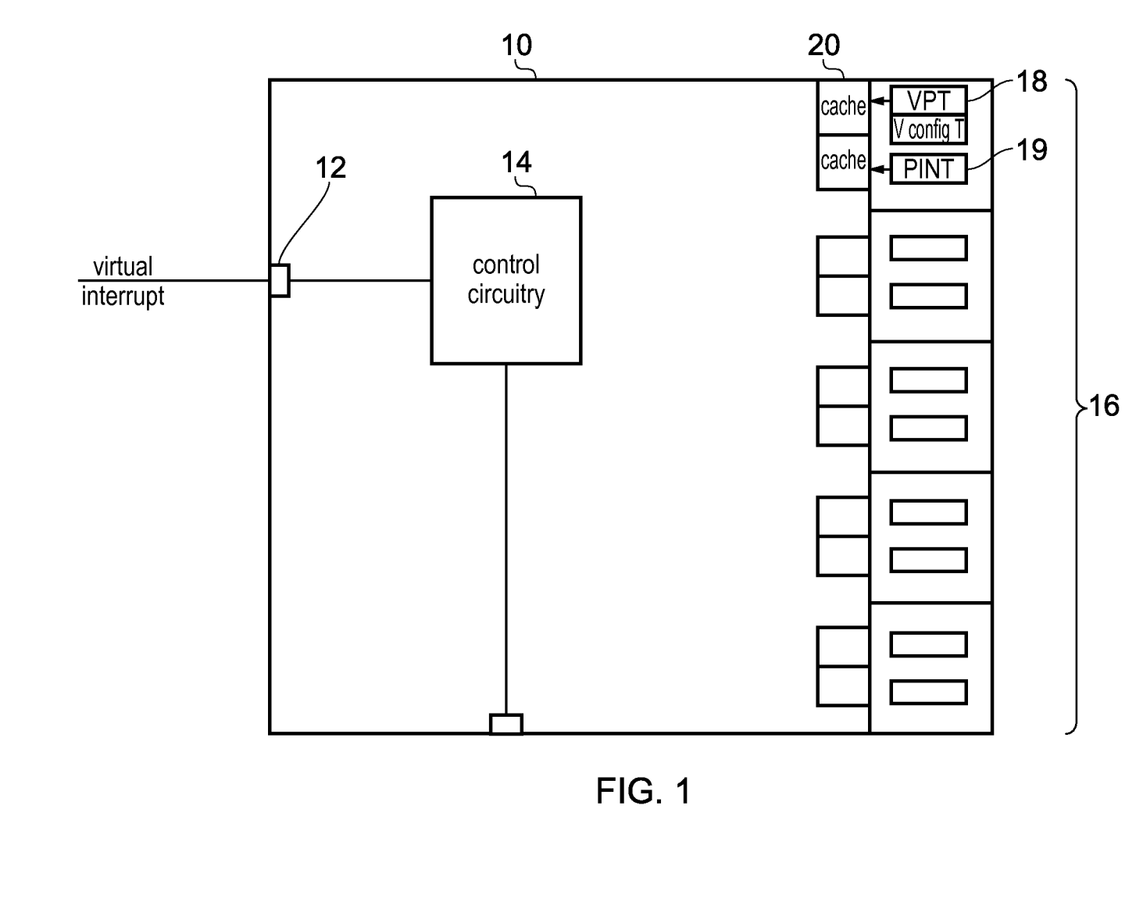
FIG. 1 shows an interrupt controller according to an embodiment of the present invention.

FIG. 1 shows an interrupt controller 10 according to an embodiment of the present invention. This interrupt controller is configured to control interrupts for a processing apparatus having a plurality of processing units at least some of which run a virtual processor. The interrupt controller 10 has an input 12 via which it receives interrupts including virtual interrupts from virtual devices, it also has control circuitry 14 for processing the received interrupts and redistribution circuitry 16. The redistribution circuitry is divided into sections each section corresponding to a physical processing unit of the processing apparatus.

On receipt of a virtual interrupt the control circuitry 14 will access memory (not shown) and determine from various tables stored therein which processing unit of the processing apparatus the virtual processor of the virtual interrupt is associated with. From this it can determine the section of redistribution circuitry 16 that it should access.

The control circuitry 14 will then access the section of redistribution circuitry 16 that corresponds to the physical processing unit that the virtual processor of the interrupt is currently associated with. The different sections of the redistribution circuitry each comprise registers 18 and 19. Register 18 stores an indicator of where the virtual pending table of a currently active virtual processor on the corresponding physical processing unit is located and register 19 stores an indicator of where a pending table of physical interrupts for this processing unit is to be found. In this embodiment the indicator stored in register 19 is in the form of pointer which points at this location.

In this embodiment each section of redistribution circuitry 16 also has a cache 20 associated with it. When a virtual processor is active on a processing unit the virtual pending tables storing pending virtual interrupts for this virtual processor are stored in this cache 20 such that they are easily accessible by the redistribution circuitry 16.

Cache 20 will also store data indicating a priority of the pending virtual interrupts and control circuitry 14 will determine the priority from the cache and will select the interrupt with the highest priority and transmit it to the processing unit running the virtual processor as required. It also controls the selection and transmission of any physical interrupts stored in the physical pending table that the pointer 19 points towards. Priorities of these interrupts are also stored.

Figure 2:
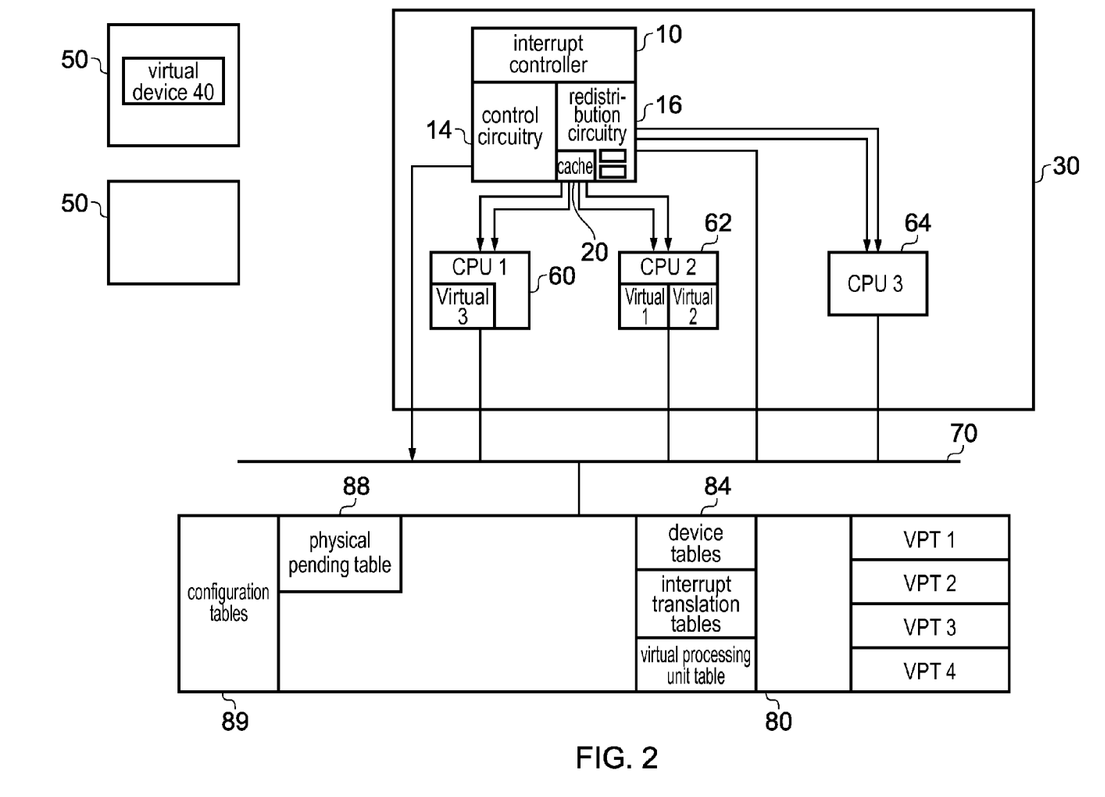
FIG. 2 shows a data processing apparatus according to an embodiment of the present invention.

FIG. 2 shows interrupt controller 10 within data processing apparatus 30. Data processing apparatus 30 receives virtual interrupts from external virtual devices 40 that may be running on physical devices 50 external to the data processing apparatus. In some embodiments these devices may be peripheral devices related to the data processing apparatus 30.

Data processing apparatus 30 has in this embodiment three CPU's 60, 62 and 64. CPU1 60 has one virtual processor currently running on it, CPU2 62 has two, while CPU3 64 has none. Each of the interrupt controller 10 and the CPU's 60, 62 and 64 are connected via bus 70 to memory 80. Memory 80 stores virtual pending tables storing pending virtual interrupts for a particular virtual processor. These virtual pending tables are shown in this embodiment as VPT1, VPT2, VPT3 and VPT4. VPT1 corresponds to virtual processor 1 running on CPU2. VPT2 corresponds to virtual processor 2 running on CPU, while VPT3 relates to virtual processor 3 running on CPU1 and VPT4 relates to a currently inactive virtual processor.

Each of these virtual pending tables VPT 1-4 stores pending virtual interrupts. The priority of these interrupts is stored in a related configuration table 89 which is accessible from the corresponding redistribution circuitry, the virtual pending table will storing information regarding how to index into this configuration table to retrieve the priority and perhaps other configuration information such as enable information for each pending interrupt. An advantage of storing the priority in a separate configuration table is that this may be set up in virtual memory such that it is accessible by the virtual processor allowing it to be updated without the intervention of the hypervisor. In this way the virtual processor can itself change the priority of pending interrupts. In this regard software will send an invalidate command to the interrupt controller 10 when updating the configuration table. The interrupt controller will route the invalidate command to the appropriate redistribution circuitry which can then reload the configuration tables that have changed.

Each of the virtual pending tables is owned by the portion of redistribution circuitry that corresponds to the CPU that the virtual processor is currently associated with. A virtual processor may be associated with a CPU when it is being run by that CPU or it may be associated with it when it is not currently active but when it is under the control of that CPU such that when it is activated it will be run on that CPU. The redistribution circuitry 16 has sole write access to the virtual pending tables and thus, updating of the virtual pending tables can only be done by the section of the redistribution circuitry 16 that corresponds to the processing unit with which the corresponding virtual processor is associated.

In this regard the redistribution circuitry 16 associated with the particular processor unit has a pointer to the virtual pending table of any virtual processor that is currently active on that processing unit. Thus, there are pointers stored in the redistribution circuitry section that is associated with CPU 2 to both VPT1 and VPT2. Current versions of these tables are also in this embodiment stored within cache 20 within redistribution circuitry 16. This allows the redistribution circuitry 16 to access these pending tables easily and to process the pending virtual interrupts and transmit the highest priority pending virtual interrupt to the CPU that is currently running the corresponding virtual processor. In this regard, the CPU will have virtual interrupt input ports in this case two ports as there are two types of potential virtual interrupts.

The virtual interrupt will be sent to the interrupt handler that runs as part of the virtual processor within the CPU which will acknowledge the received virtual interrupt using the same software that would normally acknowledge a physical interrupt.

In this embodiment, virtual processor 4 that has corresponding pending table VPT4 is not currently active. However, it is associated with CPU3 64 and thus, if a new virtual interrupt is received by interrupt controller 10 which specifies virtual processor 4 then control circuitry 14 within interrupt controller 10 will access hierarchical tables 84 within memory 80 and from these tables will determine which of the processing units 60, 62, 64 that virtual processor 4 is currently associated with, in this case CPU3 64. It will then access redistribution circuitry 16 that is associated with CPU3 and will determine that virtual processor 4 is not currently active. Redistribution circuitry 16 will update VPT4 with the virtual interrupt that it has received and it may also generate a physical interrupt which it will add to a physical interrupt pending table 88 also stored in memory that it can access using the pointer in the section of redistribution circuitry associated with CPU3.

This physical interrupt will enter the physical interrupt pending table 88 and will in time be selected and transmitted to CPU3, where it will indicate to CPU3 that there is a pending virtual interrupt for virtual processor 4. CPU3 can then choose to activate this virtual processor depending on the priority of the task it is currently performing and the priority of the interrupt and when it is activated the virtual pending table VPT4 will then be accessed and the pending virtual interrupts can be processed according to priority.

Figure 3:
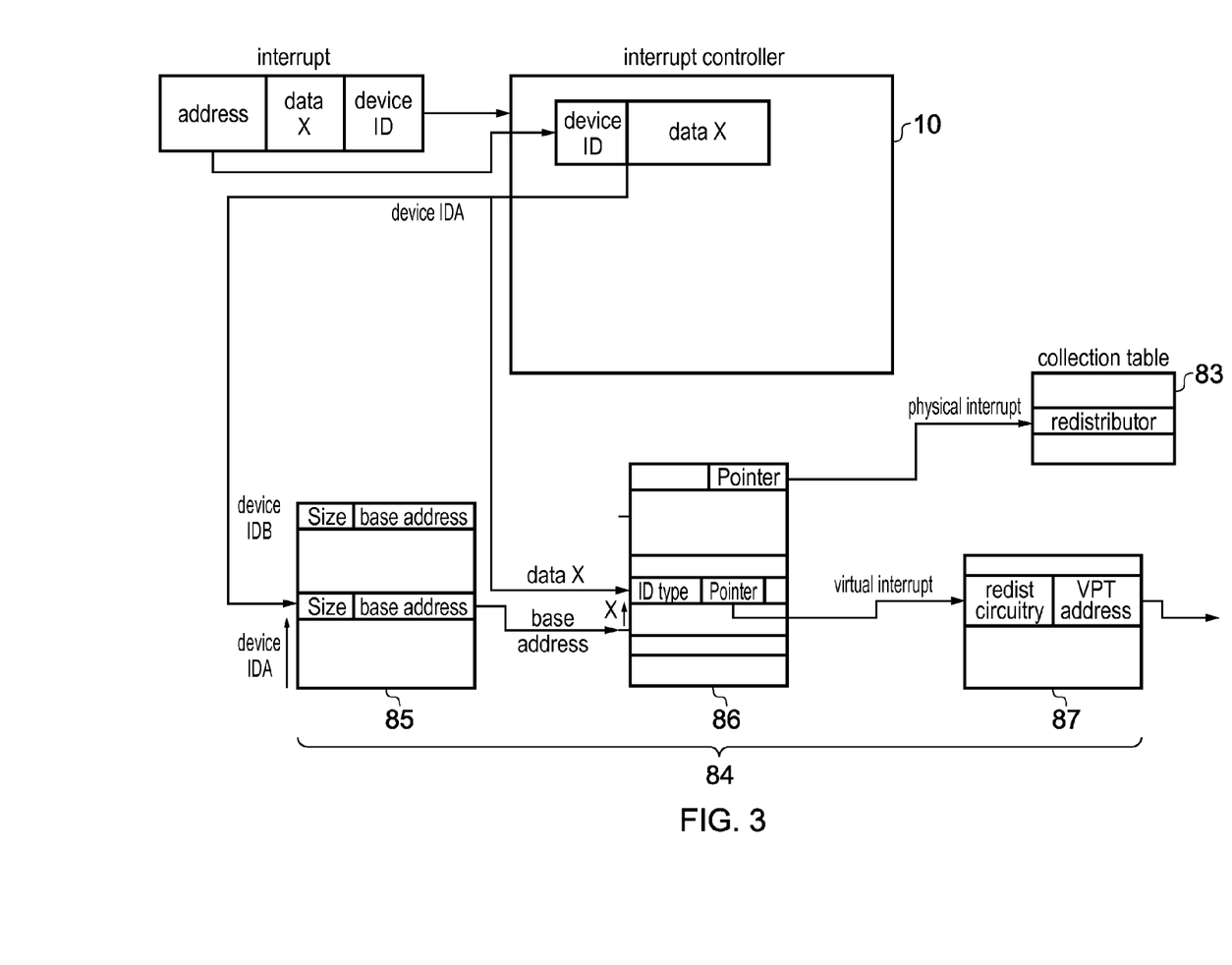
FIG. 3 shows schematically an interrupt controller interrupting with various hierarchical tables according to an embodiment of the present invention.

FIG. 3 shows this process in more detail. In the example shown an interrupt is received at the data processing unit from a virtual device. This interrupt will have an address indicating a register within the interrupt controller to which it should be written. It will have data (data x) and it will have a device ID, IDA of the device from which it was received. The interrupt controller will write the device ID and data x to the address specified and this will signal to the interrupt controller that a virtual interrupt has been received and it will access the hierarchical tables 84 in memory.

The first table accessed is a device table 85 that is indexed into using the received device ID. The Access to the device table returns information regarding the size of the space in the next table which is the interrupt translation table 86 dedicated to this device and also the base address in this table for this device. In this regard there may be separate interrupt translation tables for each device, or there may be a single table, with each device having a particular section of this table as is the case here.

The data x that is received with the interrupt indexes into this interrupt translation table 86 from the base address provided by the 85 device table. If the index is too large for the indicated size of the portion of the interrupt translation table 86 relating to the device then this signals an error and an error trap will occur. Assuming that the index is not too large then the interrupt translation table is accessed and an interrupt ID and pointer are retrieved from the table. The interrupt ID indicates whether the interrupt is a virtual or physical interrupt, in this case the interrupt received is a virtual interrupt generated by a virtual device, and the pointer points to a further table which as it is a virtual interrupt will be a virtual processing unit table 87. The virtual processing unit table 87 stores information regarding the redistribution circuitry currently associated with that virtual processor and corresponding to the physical processing unit that the virtual processor is currently associated with. It will also give the address of the virtual pending table in memory. It will also provide an index into a configuration table which stores information regarding the interrupt that is not required for routing. This includes the priority of the interrupt and an enable bit.

Thus, the interrupt controller 10 can using tables 85, 86 and 87 and the information from the interrupt determine to which processing unit the virtual processor is associated with for a virtual interrupt and also the address of the pending table for that processor. If the interrupt received was a physical interrupt from a physical device say device IDB, then this physical interrupt will index into the device table 85 using the physical device IDB and the interrupt will provide a pointer to the interrupt translation table 86 from a base address stored in the device table 85, and this interrupt translation table will in turn store a pointer to a location in collection table 83, which has the redistribution circuitry address for that particular physical processing unit and also a pointer to a pending table for physical interrupts.

Figure 4:
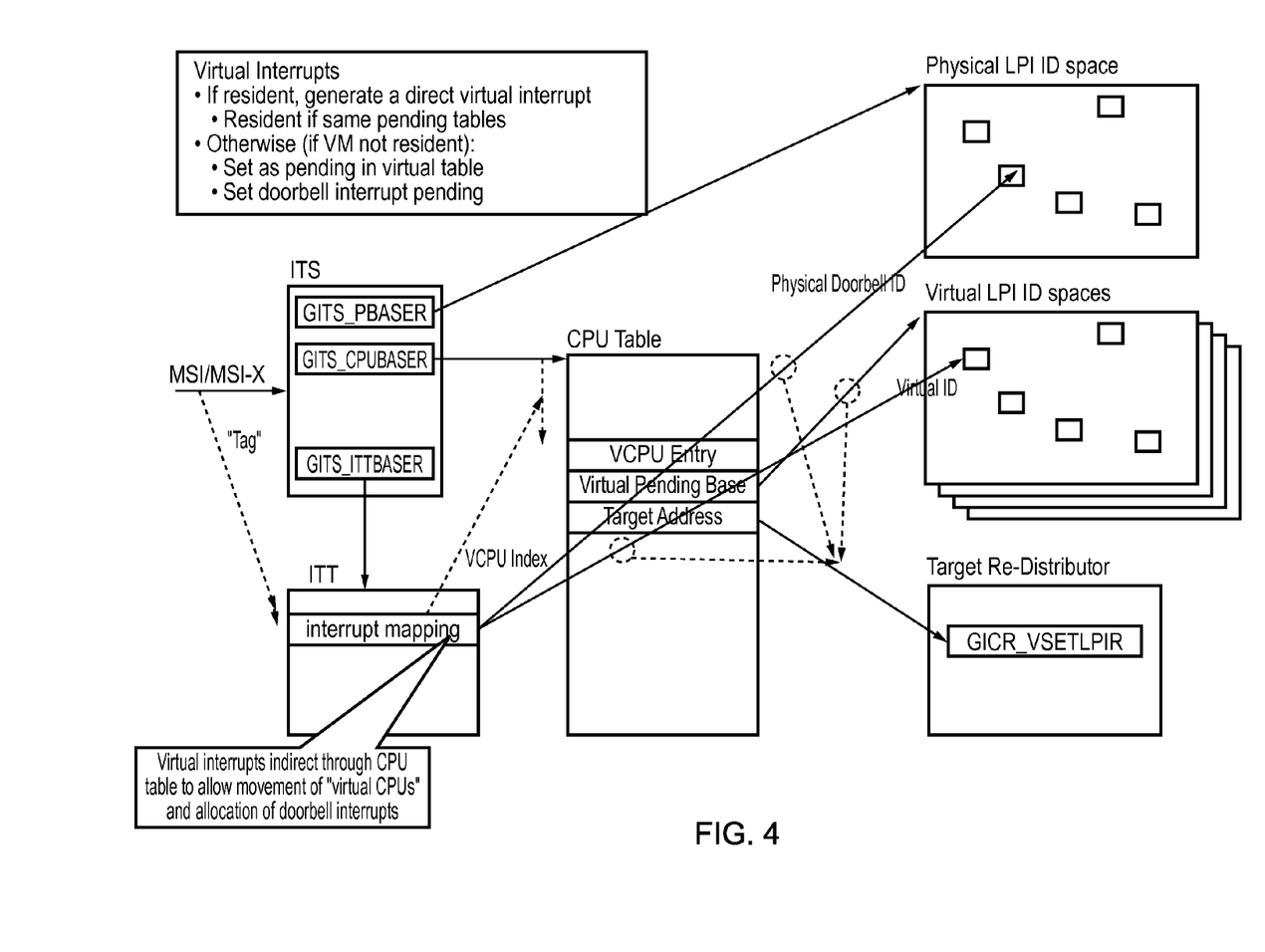
FIG. 4 shows schematically how a virtual interrupt is routed according to an embodiment of the present invention.

FIG. 4 schematically shows the receipt and routing of a virtual interrupt. Non-dashed arrows indicate source of information at the tail and the head indicates the application of that information. Thus, the interrupt is received at the ITS which is the interrupt translation service which corresponds to the interrupt controller of the previous figures and interrupt translation tables are accessed using pointers associated with the interrupt and interrupt mapping is performed to map the interrupt to the appropriate virtual ID space or physical ID space where it is determined that it is a physical interrupt.

In this regard, where there are a plurality of virtual processors there are a plurality of virtual ID spaces and the interrupt will be mapped to the appropriate one depending on the virtual processor that it is targeted at. The interrupt translation service will also determine by accessing the appropriate redistributor whether the virtual processor targeted is currently running. If it is not then it will generate a physical interrupt and this will be sent to the physical interrupt table in physical ID space. This physical interrupt will have all the properties of a normal physical interrupt such as priority which means that it can be sent to the processor according to priority and as a result of this the hypervisor is notified via a physical interrupt of any important pending virtual interrupts for non-active virtual processors without the hypervisor having to poll these virtual processors, but it is not interrupted by less important virtual interrupts.

Figure 5:
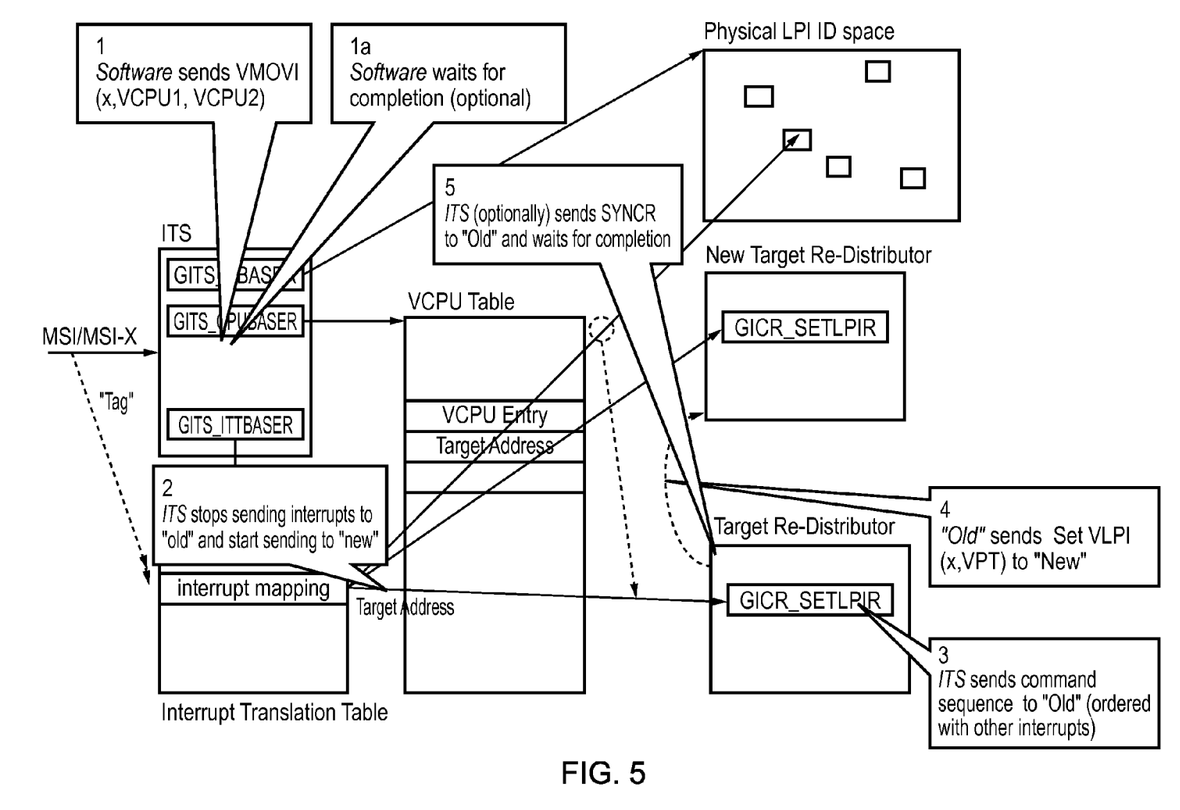
FIG. 5 shows the moving of a virtual interrupt to a different virtual processor.

FIG. 5 shows how a virtual interrupt that is received can be moved to a different virtual processor. In this regard, owing to the way that virtual interrupts are managed it is possible to re-target an interrupt from one virtual processor to a new virtual processor by having the interrupt controller and redistribution circuitry which perform the interrupt translation coordinate the move. Thus, the interrupt controller will look up the section of the redistribution circuitry to which the interrupt is currently targeted and will send it the base address of the virtual pending table of the virtual processor concerned along with the interrupt ID of the interrupt to be moved. It will also send information regarding the new target that is the base address of the new section of the redistribution circuitry and the new virtual pending table base address.

The redistribution circuitry has sole write access to the virtual pending tables and thus, it can control the move. It will read from the virtual pending table of the interrupt concerned and determine if the provided interrupt ID is pending. If it is it will clear the pending state of that interrupt ID by writing to the virtual pending table. It will then send a message to the new section of the redistribution circuitry with a new virtual pending table base address and the interrupt ID and this message causes the interrupt to be written to this table and if the virtual processor related to this table is not currently running a physical interrupt can be signalled such that the processor will know that it has a virtual interrupt pending.

Software can also issue a bather command the SYNCR command of FIG. 5 to follow these various commands to ensure that the interrupt sequence is complete prior to any other commands being sent. This barrier command will result in a blocking read over the same standard fabric as used by the move command. The messages are configured so that they cannot be reordered relative to one another.

It should be noted that if the virtual interrupt moved was in a virtual pending table for a virtual processor that was not currently active, it may have had a physical interrupt in a physical interrupt table associated with it for signalling to the software that there was a pending virtual interrupt for a virtual processor not currently running. In this embodiment, this physical interrupt is not deleted or changed in any way and will in time trigger the software to initiate the virtual processor for which there is no longer a pending virtual interrupt. This will not cause an error and therefore is not too big a problem.

With regard to FIG. 5 this sequence is shown schematically as software sending the move command which indicates that the interrupt X should be moved from the VCPU1 to VCPU2. The software may send a barrier after this command the SYNCR command and if it does so it will wait for completion of the move command indicated by a response to the SYNCR request sent after the barrier before sending other interrupts. In this regard the read command for reading the interrupt that is to be moved is followed by the SYNCR command and they can either act to block subsequent commands until a value is returned, or the redistributor can respond to the read if it is not busy, or if it is busy it can return an indication that it is busy. In this case then the read and SYNCR command will be reissued until a value is returned.

The interrupt translation service ITS will also stop sending interrupts to the VCPU1 and start sending them to VCPU2. The target redistributor for the old processor VCPU1 will send the pending interrupt to the target redistributor of VCPU2 which will update the pending tables appropriately.

Figure 6:
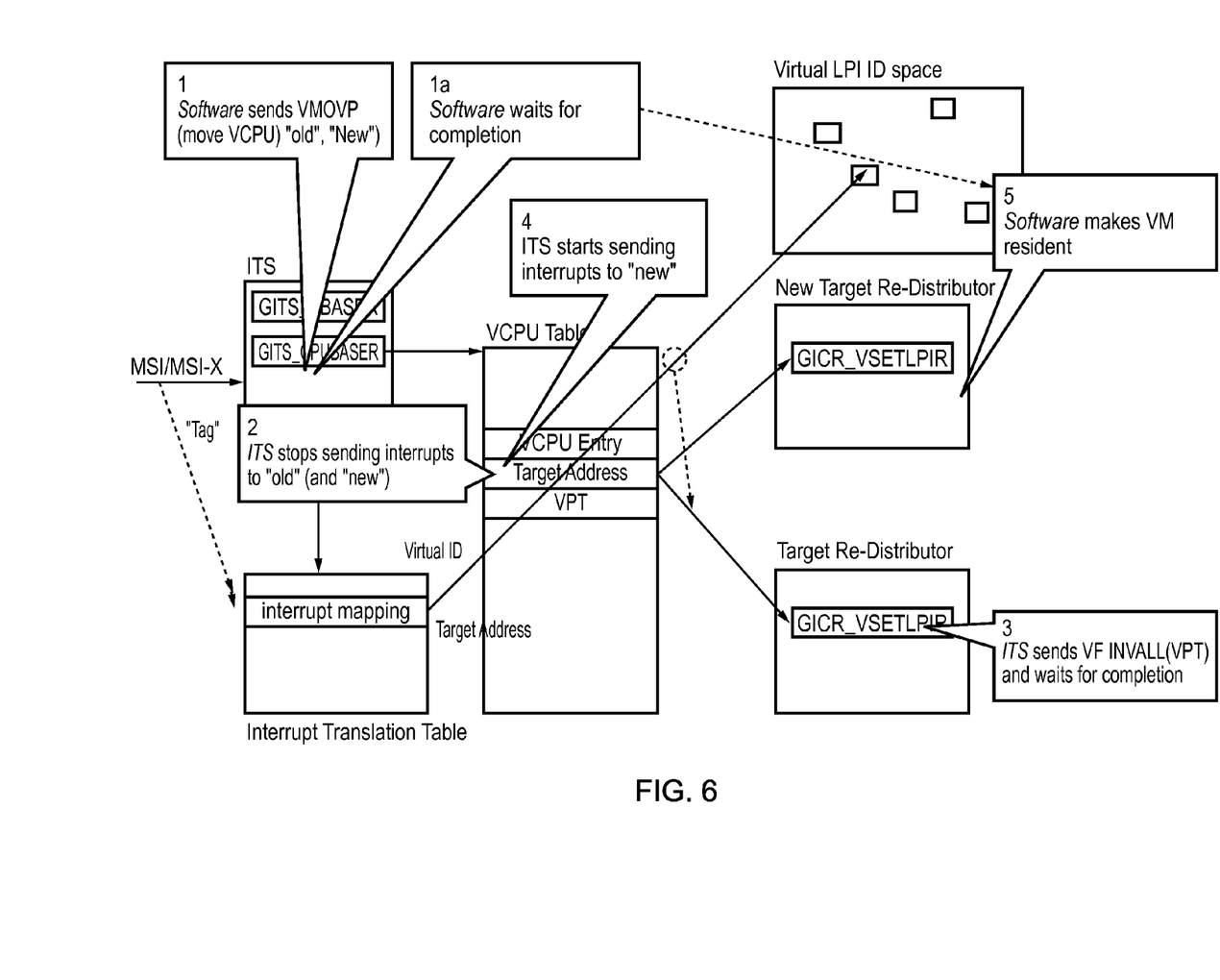
FIG. 6 shows the moving of virtual processors and the routing of pending virtual interrupts associated with this.

FIG. 6 shows an example of moving virtual CPU's from a first to a second processing unit and how the management of virtual interrupts according to an embodiment of the present invention allows this to be performed in a straightforward manner. Thus, software will update the register storing the virtual pending table pointer in the section of the redistribution circuit related to the first processing unit to no longer point to the virtual pending table for the virtual processor that is being moved and as a result of this, this section of the redistribution circuitry will flush any entries from its cache if the virtual processor was active to the virtual pending table ensuring that this is up to date. If it was not active then this step does not need to be performed. The interrupt controller will then stall sending new interrupts to this virtual CPU.

A barrier instruction will then be sent to this section of the redistribution circuitry to ensure that no new interrupts are sent before the above steps have been completed. The redistribution circuitry may respond to the bather instruction by sending its own barrier instructions to the fabric to ensure that the virtual pending table updates have become coherent and also that they have reached main memory.

The hierarchical tables will then need to be updated to point to the redistribution circuitry associated with the second processing unit for the moved virtual processor and the sending of interrupts is then un-stalled. A barrier can also be used to ensure completion of this step. Software may now update the virtual pending table pointer in the new redistribution circuitry to point to the virtual pending table of the virtual processor as part of starting to run that virtual processor.

With regard to FIG. 6 these steps are shown by software sending of the move command to move the virtual processor from an old processing unit to a new processing unit and software waiting for a completion if a barrier has been sent. The interrupt translation service stops sending new interrupts to the old processor starts sending them to the new processing unit. It will then update the tables such that the hierarchical tables indicate the new processing unit and the pointers of the redistributors are also updated such that they indicate that the virtual processor is now associated with the new processing unit.

The significance of the move commands illustrated in FIGS. 5 and 6 is that these represent the virtual equivalents of already existing physical commands and as such are easy to implement.

In the above embodiments certain attributes of the interrupts are stored in a table separate to the hierarchical translation tables 82, 84 and 86 in FIG. 2. These tables are shown in FIG. 3 and are configuration tables for the virtual interrupts. Similar configuration tables exist for the physical interrupts but are not shown. These attributes are those that are not required in the routing of the interrupt but may be required later in the process. Thus, they include such things as an interrupt's priority and enable bit.

As these things are stored in a table addressable by software in the physical implementation, when virtualised the software will attempt to make accesses to this table. In this implementation, the virtual attribute table is actually memory allocated by the OS running on the VCPU from the pool allocated to it by the hypervisor. This can all be achieved by existing memory virtualisation techniques. A pointer to this table is provided to the redistribution circuitry by the hypervisor, which it obtains when the software on the VCPU attempts to set up the table in its virtual redistributor.

It is advantageous to store as many attributes as possible in this table rather than in the main translation tables as this table can be accessed directly by the VCPU with fast standard memory virtualisation techniques, whereas updates to the translation tables require hypervisor intervention. Thus, the cost of changing priority of the interrupts for example can be reduced.

Figure 7:
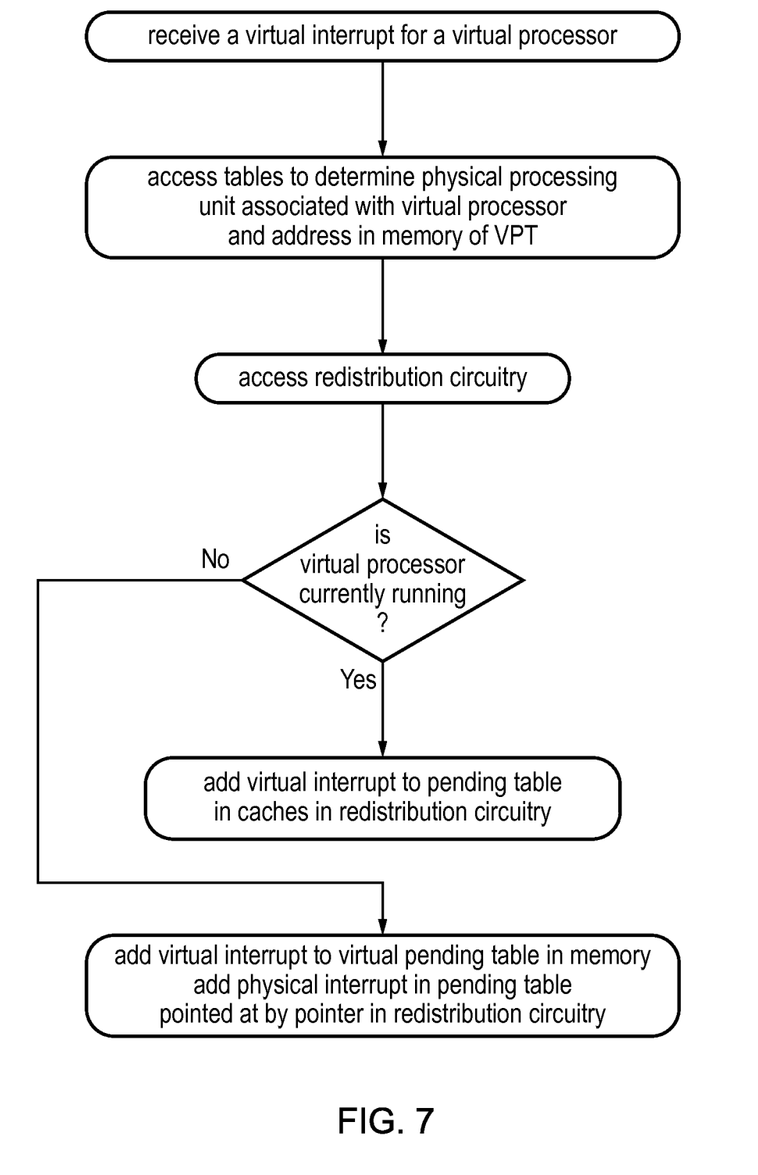
FIG. 7 shows a flow diagram illustrating steps in a method according to an embodiment of the present invention.

FIG. 7 shows a flow diagram illustrating steps in a method according to an embodiment of the present invention. A virtual interrupt for a virtual processor is received and tables are accessed to determine the physical processing unit that is currently associated with the virtual processor and also to determine the address in memory of the virtual pending table that stores pending virtual interrupts for that virtual processor. Redistribution circuitry associated with the physical processing unit concerned can then be accessed and from this circuitry one can determine if the virtual processor is currently running. That is because any virtual processor currently running will have pointers to the virtual pending table concerned within it. Thus, comparison of these pointers with the address of the virtual pending table that has been determined will determine whether or not the virtual processor is running If it is running then the virtual interrupt can be added to the virtual pending table which will be stored in caches within the redistribution circuitry. If it is not running then the virtual interrupt can be added to the virtual pending table in memory. Additionally a physical interrupt can be added to the physical interrupt pending table that is also pointed to by a pointer in redistribution circuitry. This physical interrupt signals to the processing unit that there is a virtual processor that is not currently running for which a virtual interrupt is pending. The priority of this physical interrupt can be set such that the virtual processor is activated if required and not if the virtual interrupt is not important or if it is determined that this virtual processor has a low priority for example.

Although illustrative embodiments have been described in detail herein with reference to the accompanying drawings, it is to be understood that the claims are not limited to those precise embodiments, and that various changes and modifications can be effected therein by one skilled in the art without departing from the scope and spirit of the appended claims. For example, various combinations of the features of the following dependent claims could be made with the features of the independent claims.

We claim:

1. An interrupt controller for controlling the routing and handling of interrupts received at a data processing apparatus, said data processing apparatus comprising at least one physical processing unit, said at least one physical processing unit being configured to run at least one of a plurality of virtual processors, and a memory configured to store a plurality of virtual pending tables, each virtual pending table for storing pending virtual interrupts for a corresponding one of said plurality of virtual processors, said interrupt controller comprising:

redistribution circuitry comprising at least one data store corresponding to said at least one physical processing unit, said at least one data store being configured to store, for each virtual processor currently running on said corresponding physical processing unit, a pointer to a virtual pending table configured to store currently pending virtual interrupts for said virtual processor, and to store a pointer to a pending table configured to store currently pending physical interrupts for said corresponding physical processing unit;

an input configured to receive a virtual interrupt for interrupting a virtual processor;

control circuitry configured to:
respond to receipt of said virtual interrupt to access said at least one data store in said redistribution circuitry corresponding to said at least one physical processing unit with which said virtual processor is currently associated, and to determine from said data store whether said virtual processor of said virtual interrupt is currently running on said physical processing unit; and if it is, to add said virtual interrupt to said virtual pending table pointed to by said redistribution circuitry; and if it is not, to store said virtual interrupt in said virtual pending table for said virtual processor that is stored in said memory;

wherein said control circuitry is configured in response to determining from said data store that said virtual processor is not currently running on said physical processing unit to generate a physical interrupt and store said physical interrupt in said pending table pointed to by said accessed data store in said redistribution circuitry, said physical interrupt indicating that there is a pending interrupt for a virtual processor not currently running.

2. An interrupt controller according to claim 1, wherein said control circuitry is configured to set a priority of said physical interrupt stored in said pending table, said priority being set in dependence upon at least one of a priority of said virtual interrupt and a priority for pending virtual interrupts set for said virtual processor by software during configuration.

3. An interrupt controller according to claim 1, wherein said data processing apparatus comprises a plurality of processing units, and said redistribution circuitry comprises a plurality of said data stores, each of said plurality of data stores corresponding to one of said plurality of said processing units.

4. An interrupt controller according to claim 3, wherein said control circuitry is configured to respond to receipt of said virtual interrupt to access a set of hierarchical tables stored in said memory to determine said physical processing unit with which said virtual processor is currently associated.

5. An interrupt controller according to claim 4, wherein said set of hierarchical tables comprises a device table, an interrupt translation table and a virtual processing unit table, said control circuitry being configured to access a location in said device table identified by said virtual interrupt, said accessed location indicating a portion of an interrupt translation table to access, and to access a location identified by said virtual interrupt in said portion of said interrupt translation table identified by said device table, said data stored in said accessed location in said interrupt translation table providing an indication of a location in said virtual processing unit table, which location stores data indicating which of said plurality of processing units said virtual processor to be interrupted by said virtual interrupt is currently associated with.

6. An interrupt controller according to claim 4, comprising a further table associated with said set of hierarchical tables for storing information regarding said virtual interrupts said information including a priority of said virtual interrupt.

7. An interrupt controller according to claim 1, said redistribution circuitry comprising a plurality of caches associated with said plurality of data stores, said plurality of caches being configured to store said virtual pending table of said virtual processor currently running on said corresponding physical processing unit.

8. An interrupt controller according to claim 3, wherein said redistribution circuitry comprises a plurality of units each comprising one of said at least one data store and each associated with one of said plurality of processing units, each of said units of said redistribution circuitry being configured to have sole write access to a portion of said memory storing said virtual pending tables for virtual processors currently associated with said corresponding physical processing unit.

9. An interrupt controller according to claim 8, said interrupt controller being configured to respond to receipt of a move command to move a virtual interrupt targeted at one virtual processor to target a different virtual processor by:
    determining a base address of said virtual pending table and which physical processing unit said virtual processor is currently associated with for both said one virtual processor and said different virtual processor;
    accessing said unit of said redistribution circuitry corresponding to said physical processing unit with which said one virtual processor is currently associated and transmitting to said redistribution circuitry said base addresses of said virtual pending tables and data regarding said physical processing unit that said different virtual processor is associated with:
    accessing said unit of said redistribution circuitry corresponding to said physical processing unit with which said different virtual processor is currently associated;
    said redistribution circuitry being configured on receipt of said data to clear a pending status of said virtual interrupt in said virtual pending table for said one virtual processor; and
    to update said virtual pending table of said different virtual processor with said pending virtual interrupt.

10. An interrupt controller according to claim 9, wherein said interrupt controller is configured to clear a pending status of said virtual interrupt by deleting said interrupt from said virtual pending table.

11. An interrupt controller according to claim 9, wherein said redistribution unit corresponding to said physical processing unit with which said different virtual processor is currently associated, is configured to determine whether said virtual processor of said virtual interrupt is currently running on said physical processing unit and if it is not, to store a physical interrupt in said pending table pointed to by said accessed data store in said redistribution circuitry, said physical interrupt indicating that there is a pending virtual interrupt for a virtual processor not currently running.

12. An interrupt controller according to claim 9, said interrupt controller being configured to respond to said move command by issuing a barrier command to follow said move command such that read accesses to said redistribution circuitry cannot complete until said accesses to said redistribution circuitry triggered by said move command have completed.

13. An interrupt controller according to claim 4, said interrupt controller being configured to respond to receipt of a move between physical processing units command which signals moving of a virtual processor associated with one of said plurality of physical processing units to a different one of said plurality of physical processing units, to:
    access said data store in said redistribution circuitry corresponding to said physical processing unit with which said virtual processor was originally associated and to determine from said pointer if said virtual processor is currently running and if so, said redistribution circuitry is configured to write data from said virtual pending table pointed to by said pointer to a corresponding virtual pending table stored in memory; and
    to update said hierarchical tables such that said virtual processor is associated with said different one of said plurality of physical processing units.

14. An interrupt controller according to claim 13, wherein said interrupt controller is configured to stall sending any newly received interrupts to said virtual processor being moved until said update of said hierarchical tables is complete.

15. An interrupt controller according to claim 14, wherein said interrupt controller is configured to issue a barrier command to follow said move between physical processing units command, said interrupt controller awaiting a response to said barrier command before issuing further interrupts, said response indicating that said update of said hierarchical tables has completed.

16. A data processing apparatus comprising:
    at least one physical processing unit, said at least one physical processing unit being configured to run at least one of a plurality of virtual processors;
    a memory configured to store a plurality of virtual pending tables, each virtual pending table for storing pending virtual interrupts for a corresponding one of said plurality of virtual processors; and
    an interrupt controller for controlling and handling interrupts received at the data processing apparatus, said interrupt controller including:
        redistribution circuitry comprising at least one data store corresponding to said at least one physical processing unit, said at least one data store being configured to store, for each virtual processor currently running on said corresponding physical processing unit, a pointer to a virtual pending table configured to store currently pending virtual interrupts for said virtual processor, and to store a pointer to a pending table configured to store currently pending physical interrupts for said corresponding physical processing unit;
        an input configured to receive a virtual interrupt for interrupting a virtual processor;
        control circuitry configured to:
            respond to receipt of said virtual interrupt to access said at least one data store in said redistribution circuitry corresponding to said at least one physical processing unit with which said virtual processor is currently associated, and to determine from said data store whether said virtual processor of said virtual interrupt is currently running on said physical processing unit; and if it is, to add said virtual interrupt to said virtual pending table pointed to by said redistribution circuitry; and if it is not, to store said virtual interrupt in said virtual pending table for said virtual processor that is stored in said memory;

wherein said control circuitry is configured in response to determining from said data store that said virtual processor is not currently running on said physical processing unit to generate a physical interrupt and store said physical interrupt in said pending table pointed to by said accessed data store in said redistribution circuitry, said physical interrupt indicating that there is a pending interrupt for a virtual processor not currently running.

17. A data processing apparatus according to claim 16, wherein said memory is configured to store a set of hierarchical tables for controlling said interrupts, said hierarchical tables comprising device, interrupt translation and virtual processing unit tables, said tables being accessible in response to one of said interrupts, said interrupt indicating a location to access in said device and interrupt translation tables;

said device table storing a pointer to said interrupt translation table;

said interrupt translation table storing an interrupt identifier and a pointer to said virtual processing unit table; and said virtual processing unit table storing data indicating which of said plurality of processing units said virtual processor to be interrupted by said virtual interrupt is currently associated with.

18. A method of controlling the routing and handling of interrupts received at a data processing apparatus, said data processing apparatus comprising at least one physical processing unit, said at least one physical processing unit being configured to run at least one of a plurality of virtual processors, and a memory configured to store a plurality of virtual pending tables, each virtual pending table for storing pending virtual interrupts for a corresponding one of said plurality of virtual processors, said method comprising the steps of:

receiving a virtual interrupt for interrupting a virtual processor;

determining which of said at least one physical processing units said virtual processor is currently associated with;

accessing a data store in redistribution circuitry corresponding to said at least one physical processing unit with which said virtual processor is currently associated, said data store being configured to store, for each virtual processor currently running on said corresponding physical processing unit, a pointer to a virtual pending table configured to store currently pending virtual interrupts for said virtual processor, and to store a pointer to a pending table configured to store currently pending physical interrupts for said corresponding physical processing unit;

determining from said data store whether said virtual processor of said virtual interrupt is currently running on said at least one physical processing unit;

if it is, adding said virtual interrupt to said virtual pending table pointed to by said redistribution circuitry; and if it is not, storing said virtual interrupt in said virtual pending table for said virtual processor that is stored in said memory;

in response to determining from said data store that said virtual processor is not currently running on said physical processing unit, generating a physical interrupt and storing said physical interrupt in said pending table pointed to by said data store in said redistribution circuitry, said physical interrupt indicating that there is a pending interrupt for a virtual processor not currently running.

19. A method according to claim 18, said method further comprising in response to determining from said data store that said virtual processor is not currently running on said physical processing unit, storing an interrupt in said pending table pointed to by said accessed data store in said redistribution circuitry, said interrupt indicating that there is a pending interrupt for a virtual processor not currently running.

20. A method according to claim 18, comprising the further steps of in response to receiving a move command to move a received virtual interrupt from one virtual processor to a different virtual processor:

determining a base address of said virtual pending table and determining which physical processing unit said virtual processor is currently associated with for both said one virtual processor and said different virtual processor;

accessing said data store in said redistribution circuitry corresponding to said physical processing unit with which said one virtual processor is currently associated and transmitting to said redistribution circuitry said base addresses of said virtual pending tables and data regarding said physical processing unit that said different virtual processor is associated with:

clearing a pending status of said virtual interrupt in said virtual pending table for said one virtual processor; and accessing said data store of said redistribution circuitry corresponding to said physical processing unit with which said different virtual processor is currently associated and updating said virtual pending table of said different virtual processor with said pending virtual interrupt.

21. computer program product for controlling routing and handling of interrupts received at a data processing apparatus, said data processing apparatus including at least one physical processing unit, said at least one physical processing unit being configured to run at least one of a plurality of virtual processors, and a memory configured to store a plurality of virtual pending tables, each virtual pending table for storing pending virtual interrupts for a corresponding one of said plurality of virtual processors, said computer program product for controlling said data processing apparatus to perform the steps of:

receiving a virtual interrupt for interrupting a virtual processor;

determining which of said at least one physical processing units said virtual processor is currently associated with;

accessing a data store in redistribution circuitry corresponding to said at least one physical processing unit with which said virtual processor is currently associated, said data store being configured to store, for each virtual processor currently running on said corresponding physical processing unit, a pointer to a virtual pending table configured to store currently pending virtual interrupts for said virtual processor, and to store a pointer to a pending table configured to store currently pending physical interrupts for said corresponding physical processing unit;

determining from said data store whether said virtual processor of said virtual interrupt is currently running on said at least one physical processing unit;

if it is, adding said virtual interrupt to said virtual pending table pointed to by said redistribution circuitry; and if it is not, storing said virtual interrupt in said virtual pending table for said virtual processor that is stored in said memory;

in response to determining from said data store that said virtual processor is not currently running on said physical processing unit, generating a physical interrupt and storing said physical interrupt in said pending table pointed to by said data store in said redistribution circuitry, said physical interrupt indicating that there is a pending interrupt for a virtual processor not currently running.

22. An interrupt controlling means for controlling the routing and handling of interrupts received at a data processing apparatus, said data processing apparatus comprising at least one physical processing means for running at least one of a plurality of virtual processing means, and a memory means for storing a plurality of virtual pending tables, each virtual pending table for storing pending virtual interrupts for a corresponding one of said plurality of virtual processing means, said interrupt controlling means comprising:

redistribution means comprising at least one data storing means corresponding to said at least one physical processing means, said at least one data storing means for storing, for a virtual processing means currently running on said corresponding physical processing means, a pointer to a virtual pending table configured to store currently pending virtual interrupts for said virtual processing means, and for storing a pointer to a pending table configured to store currently pending physical interrupts for said corresponding physical processing means;

an input means for receiving a virtual interrupt for interrupting a virtual processing means;

control means for:
  responding to receipt of said virtual interrupt to access said at least one data storing means in said redistribution means circuitry corresponding to said at least one physical processing means with which said virtual processing means is currently associated, and
  determining from said data storing means whether said virtual processing means of said virtual interrupt is currently running on said physical processing means; and
  if it is, adding said virtual interrupt to said virtual pending table pointed to by said redistribution means; and
  if it is not, storing said virtual interrupt in said virtual pending table for said virtual processing means that is stored in said memory means;

wherein said control means, in response to determining from said data storing means that said virtual processing means is not currently running on said physical processing means for generating a physical interrupt and for storing said physical interrupt in said pending table pointed to by said accessed data storing means in said redistribution means, said physical interrupt indicating that there is a pending interrupt for a virtual processing means not currently running.

* * * * *